April 14, 1931.  J. D. LEMEX  1,800,736

FISHING TOOL

Filed Nov. 16, 1928

INVENTOR
John D. Lemex
by W. F. Dodick
Attorney

Patented Apr. 14, 1931

1,800,736

UNITED STATES PATENT OFFICE

JOHN D. LEMEX, OF TULSA, OKLAHOMA, ASSIGNOR, BY MESNE ASSIGNMENTS, TO OIL WELL SUPPLY COMPANY, OF PITTSBURGH, PENNSYLVANIA, A CORPORATION OF NEW JERSEY

FISHING TOOL

Application filed November 16, 1928. Serial No. 319,904.

My invention relates to fishing tools, and more particularly to that class of tools known as a sucker rod socket, the tool being particularly designed to be employed for fishing for broken rods of pumps positioned adjacent the lower end of a well tubing. As a rule, there is very little clearance between the inner surface of the tubing and the outer surface of the pump rods; and, consequently, the tool employed for fishing for these rods must be of a character that may be manipulated within the relatively small space between the inside of the tubing and the outside of the rods. Further, it frequently happens that sand and other foreign matter covers the lost or broken tool or other fished-for article in such a manner as to prevent a withdrawal of the article after it has been gripped by the fishing tool.

One object of my invention is to provide a tool for use in fishing for broken rods of pumps and the like which is capable of operation in a relatively small space, which may be manipulated to release the gripped rod in the event that it is impossible to loosen or pull the same from the well, and which is made up of parts which may be easily taken down so that replacements may be made and the parts readily assembled again.

In the accompanying drawings, which illustrates an application of my invention:

Figure 1:
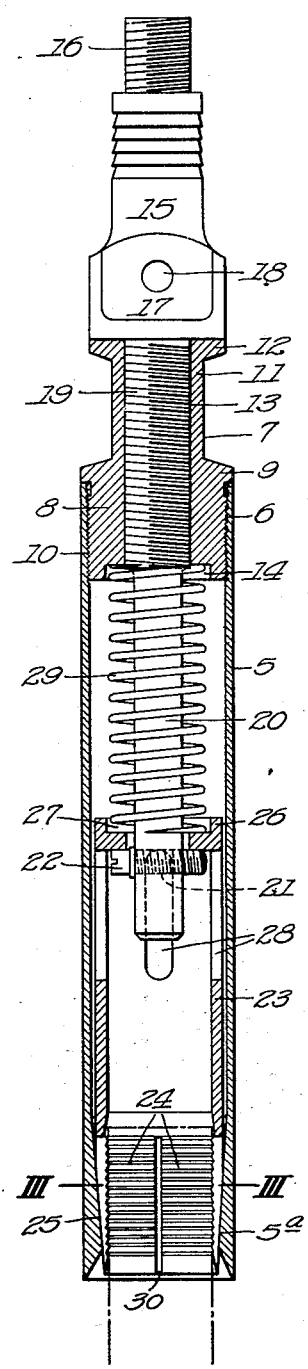
Fig. 1 is a part vertical sectional and a part elevational view of a fishing tool embodying my invention, showing the slips in gripping position.

Referring to the drawings, my improved fishing tool, as illustrated and as preferred, includes a hollow cylindrical body 5 having its wall at one end thickened and tapered to provide a conical bore portion 5a for the reception of the slips of the tool and its opposite end internally threaded, as at 6, to receive a closure member 7.

Closure member 7 comprises a head 8 flanged at 9 and formed with an externally threaded portion 10, adapted to be entered in the upper end of the body, and a tubular extension 11 having an annular flange 12. The closure member is also formed with a longitudinally extending threaded bore 13 and with an annular recess 14.

15 designates a combined coupling, slip carrying and actuating member rotatably and adjustably mounted in the closure member and having portions projecting outwardly and inwardly of said closure member. Member 15, as shown, includes an upper threaded part 16 adapted to be connected to a section of the string employed for lowering the tool into and raising it from a well, an enlarged part 17 adapted to be seated upon the flange 12 of the closure member, said part 17 being formed with an opening 18 through which a rod may be passed, in order to position the tool on the upper end of the tubing when connecting up the string.

Extending downwardly from the enlarged part 17 is a threaded mandrel portion 19, the left-handed threads thereof being adapted to cooperate with the threaded bore 13 of the closure member. In addition to the elements mentioned, member 15 is formed with an elongated stem 20 having, near its lower end, a threaded opening 21 for the reception of a threaded transversely extending pin or bolt 22.

Mounted within the body and movably supported on the member 15 is a slip cage 23 having its serrated slips 24 tapered at 25, and arranged to operate in the conical bore portion 5a of the body, and the tapered portions of the slips are adapted to coact with the tapered wall of the said conical portion. Cage 23 at its upper end is provided with a collar 26 formed with a spring-receiving recess 27. Cage 23 is further formed with diametrically opposed slots 28, through which the bolt 22 may be passed in attaching the cage to the stem portion 20 of member 15.

Interposed between the collar 26 and the closure member and having its respective ends located in the recesses 27 and 14 of said members, I provide a compression spring 29 functioning to exert a downward pressure upon the slip cage.

In practice, the tool is let down into a well, with the parts substantially in the positions shown by Fig. 1. Upon reaching the sucker rod or other object fished for, said object will be received by or entered into the contracted slips, raising them slightly, as well as the slip cage, against the action of spring 29 sufficiently to permit the slips to be passed down around the object far enough to ensure a firm grip upon elevation of the tool.

The instant the tool is raised, the spring 29 forces the cage and its slips downwardly and, owing to the co-action of the tapered portions of the slips and the body, the slips will be contracted and forced into gripping engagement with the sucker rod or other object. In the embodiment of my invention shown, the slips are formed integral with the cage, but the cage at its slip end is split, as indicated at 30, to provide clearance between the respective slip portions.

Figure 2:
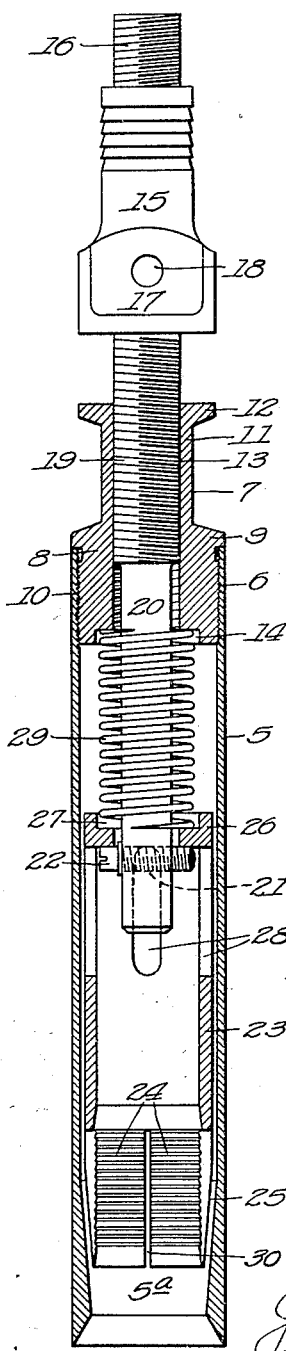
Fig. 2 is a view similar to Fig. 1, showing the slips raised or in non-gripping position; and Fg. 3 is a horizontal section taken on the line III—III of Fig. 1.
Figure 3:
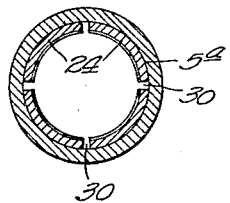

Should it be found that the sucker rods, etc., fished for cannot be pulled by the fishing tool, it will be necessary to release the tool from the fished-for article, and my invention provides a construction by which the release of the tool from the article may be readily accomplished. This release may be effected by revolving or turning the string of pipe or rods employed for lowering and raising the tool. This rotative movement imparted to the string in a manner well known in the art will cause the threaded portion 19 of member 15 to turn within the threaded bore of the closure member 7. As a result of the relative rotation thus produced, the body 5 will be forced downwardly and the conical bore portion 5a will slide out from beneath the slips 24. The latter will no longer be wedged inwardly against the article and accordingly will flex outwardly to release the same. After the release of the slips in the manner described, the tool may be raised in the usual manner. Fig. 2 of the drawings shows the positions of the parts of the tool after the tool is released from the pump rod or other fished-for article.

My construction enables the parts of the tool to be readily assembled within the body member and in the event of breaking or wear, the enclosed parts may be easily removed for replacement.

A further additional advantage and object of my invention is to provide a construction enabling the tool to be readily detached from the fish, in cases where the fish has been raised to the top of the well by the tool. It will be apparent that this release may be effected at the ground level in the manner above described, by backing out the threaded portion 19 of member 15 from the threaded base of the closure member.

I claim:

1. A fishing tool comprising a hollow body, a longitudinally extending rotatable combined coupling and slip supporting member having a portion entered in the body, and a spring pressed slip cage and slips slidably mounted on the rotatable member, said member having an opening therethrough and a pin in said opening for engagement with the cage, and said cage being slotted to permit insertion of the pin into said member.

2. A fishing tool comprising a hollow body, a rotatable combined coupling and slip supporting member having a portion entered in the body, a closure element for the body through which the rotatable member is passed, and a spring pressed slip cage and slips slidably mounted on said member, said member having an opening therethrough and a pin in said opening for engagement with the cage, and said cage being slotted to permit insertion of the pin into said member.

3. A fishing tool comprising a hollow body, a slip cage and slips movably entered in the body, resilient means for urging the slips into operative position, a rotatable combined coupling and slip supporting member, and an insertible locking means carried by the rotatable member for engagement with the cage, said cage being slotted to permit insertion of the locking means.

4. A fishing tool comprising a hollow body member having a tapering bore at the lower end, slips movable within the bore, a removable closure member for the upper end of the body member having a threaded opening therein, and a combined coupling and slip supporting member extending through said opening in the closure member to support the slips, and having reverse threads thereon, one portion of the threads engaging the threaded opening in the closure member and the other portion of the threads being adapted for coupling to a string.

5. A fishing tool comprising a hollow body member, a removable closure member for the upper end of the body member, said closure member having a threaded opening therein, a combined coupling and slip supporting member extending through the closure member and having reverse threads thereon, one portion of the threads engaging the threaded opening in the closure member and the other portion of the threads being adapted for coupling to a string, slips carried within the body member by the inwardly projecting portion of the coupling and supporting member, and a spring within the body member for urging the slips downwardly.

6. A fishing tool comprising a hollow body having a tapering bore at one end, a slip cage and slips movably entered in the body, resilient means for urging the cage toward the tapered end of the bore, a closure member for the other end of the body, said closure member having a threaded opening therein, and a combined coupling and slip cage supporting member extending through the opening in the closure member to engage the slip cage, said coupling and supporting member having reverse threads thereon, of which one portion engages the threaded opening in the closure member and the other portion is adapted for coupling to a string.

7. A fishing tool comprising a hollow body member, a removable closure member for the upper end of the body member, a coupling member extending through the closure member and having an opening through the end thereof which extends into the body member, said coupling member and closure member having cooperating portions operable to move the coupling member longitudinally of the body member, a slip cage mounted on the inner end of the coupling member, slips on said cage, and a pin insertible in said opening in the coupling member to secure the slip cage to said coupling member, said cage having a slot to permit insertion and removal of the pin.

In testimony whereof I affix my signature.

JOHN D. LEMEX.